United States Patent
Johnson et al.

(10) Patent No.: US 7,702,183 B1
(45) Date of Patent: Apr. 20, 2010

(54) METHODS AND SYSTEMS FOR THE DETECTION OF THE INSERTION, REMOVAL, AND CHANGE OF OBJECTS WITHIN A SCENE THROUGH THE USE OF IMAGERY

(75) Inventors: Ted L. Johnson, Florissant, MO (US); Michael G. Neff, Lake St. Louis, MO (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 11/383,914

(22) Filed: May 17, 2006

(51) Int. Cl.
*G06K 9/32* (2006.01)
*G06K 9/68* (2006.01)
*G06K 9/00* (2006.01)

(52) U.S. Cl. ...................... 382/294; 382/219
(58) Field of Classification Search .......... 382/103, 382/107, 164, 173, 181, 190, 209, 218–220, 382/276–277, 284, 287, 294; 348/169, 188, 348/263, 584, 591, 699, E9.007
See application file for complete search history.

(56) References Cited

U.S. PATENT DOCUMENTS

| | | | |
|---|---|---|---|
| 3,799,676 A | 3/1974 | Chatterton | |
| 4,133,003 A * | 1/1979 | Flory et al. | 348/263 |
| 5,150,426 A * | 9/1992 | Banh et al. | 382/103 |
| 5,436,672 A * | 7/1995 | Medioni et al. | 348/591 |
| 5,453,840 A * | 9/1995 | Parker et al. | 356/400 |
| 5,581,637 A * | 12/1996 | Cass et al. | 382/284 |
| 5,672,872 A | 9/1997 | Wu et al. | |
| 5,809,171 A | 9/1998 | Neff et al. | |
| 5,890,808 A | 4/1999 | Neff et al. | |
| 5,946,422 A | 8/1999 | Neff et al. | |
| 5,982,930 A | 11/1999 | Neff et al. | |

(Continued)

FOREIGN PATENT DOCUMENTS

EP 1262789 A2 12/2002

(Continued)

OTHER PUBLICATIONS

Blake et al., "Data Fusion for Visual Tracking With Particles", Proceedings of the IEEE, New York, vol. 92, No. 3, Mar. 2004, pp. 495-511.

(Continued)

*Primary Examiner*—Amir Alavi

(57) ABSTRACT

Methods and systems for detecting the insertion, removal, and change of objects of interest through the use of imagery are disclosed. In one embodiment, a method includes performing a scene registration including aligning image patterns in the first image to those in the second image; performing a feature content analysis to determine a likelihood of change for each pixel in the first and second images; performing a region identification to group pixels within the first and second images into one or more image regions based upon their likelihood of change; and performing an image region partitioning to prioritize the one or more image regions according to an image region score for each of the one or more image regions, the image region score being indicative of at least one of insertion, removal, and change of an object of interest within the common area of interest. Embodiments of the invention may advantageously provide an autonomous capability to detect the insertion, removal, and change of objects of interest.

20 Claims, 14 Drawing Sheets

U.S. PATENT DOCUMENTS

| | | | |
|---|---|---|---|
| 5,982,945 | A | 11/1999 | Neff et al. |
| 6,154,567 | A * | 11/2000 | McGarry ................... 382/219 |
| 6,173,087 | B1 * | 1/2001 | Kumar et al. ............... 382/284 |
| 6,798,897 | B1 * | 9/2004 | Rosenberg ................. 382/107 |
| 7,103,234 | B2 * | 9/2006 | Stone et al. ................ 382/294 |
| 2003/0222789 | A1 | 12/2003 | Polyakov |
| 2004/0006424 | A1 | 1/2004 | Joyce et al. |
| 2006/0058954 | A1 | 3/2006 | Haney |

FOREIGN PATENT DOCUMENTS

| | | |
|---|---|---|
| EP | 1293925 | 3/2003 |
| GB | 2330801 | 5/1999 |
| JP | 2004325165 | 11/2004 |
| WO | WO2004084136 | 9/2004 |

OTHER PUBLICATIONS

Cohen et al., "Detecting and Tracking Moving Objects for Video Surveillance", Computer Vision and Pattern Recognition, IEEE conference, vol. 2, Jun. 23, 1999, pp. 319-325.

Yalcin et al., "A Flow-Based Approach to Vehicle Detection and Background Mosaicking in Airborne Video", Technical Reports, Mar. 2005, pp. 1-15.

Efe et al., "A Tracking Algorithm for Both Highly Maneuvering and Nonmaneuvering Targets", Proceedings of the 36th Conference on Decision & Control, San Diego, CA, Dec. 10, 1997, vol. 4, pp. 3150-3155.

UK Search Report for Application No. GB0709142.4, dated Aug. 31, 2007, 2 pgs.

* cited by examiner

METHODS AND SYSTEMS FOR THE DETECTION OF THE INSERTION, REMOVAL, AND CHANGE OF OBJECTS WITHIN A SCENE THROUGH THE USE OF IMAGERY

CROSS REFERENCE TO RELATED APPLICATIONS

This patent application is related to the following co-pending, commonly-owned U.S. Patent Applications: U.S. patent application Ser. No. 11/383,919 entitled "Methods and Systems for Data Link Front End Filters for Sporadic Updates" filed on May 17, 2006; U.S. patent application Ser. No. 11/383,911 entitled "Multiple Moving Target Detection" filed on May 17, 2006; U.S. patent application Ser. No. 11/383,907 entitled "Route Search Planner" filed on May 17, 2006; and U.S. patent application Ser. No. 11/383,900 entitled "Sensor Scan Planner" filed on May 17, 2006, which applications are incorporated herein by reference.

FIELD OF THE INVENTION

This invention relates to image analysis and, more specifically, to the detection of the insertion, removal, and change of objects within a scene through the use of imagery.

BACKGROUND OF THE INVENTION

The detonation of Improvised Explosive Devices (IEDs) is a new and ongoing threat to both occupation ground forces and innocent civilians in war zones. IEDs can be constructed at a remote location and then transported and installed within a short period of time by a minimum number of opposition forces. To escape detection, IEDs are typically embedded into and appear as part of their local surrounding. Once installed, IEDs can be detonated autonomously or manually by an operator hidden nearby.

The current methods used to detect IEDs prior to their detonation requires one or more human image analysts to manually conduct a detailed and thorough review of an extensive database of imagery collected by one or more Unmanned Aerial Vehicles (UAV) or by other imaging means. Given the small size and camouflaged appearance of IEDs, the required image analyses may be tedious and can be overwhelming to a given set of image analysts. Therefore, there exists an unmet need for quickly and accurately determining the insertion of an IED into an area of interest through an analysis of multiple images containing a common area of interest.

SUMMARY OF THE INVENTION

The present invention provides systems and methods for detecting the insertion, removal and change of objects of interest through the comparison of two or more images containing a common area of interest. Embodiments of the present invention may advantageously provide an autonomous capability to reduce the time required for image analysts to review an imagery database by emphasizing image regions that have an increased likelihood of containing the insertion, removal, and change of an object of interest. Embodiments of the present invention may be used to detect a variety of objects of interest in a variety of circumstances and applications, such as detecting an IED, or detecting new facilities, capabilities, movements, or strategic thrusts by hostile parties, or for non-military applications, such as for search and rescue, or for conducting research into environmental changes or wildlife habits.

In one embodiment, a method for detecting at least one of insertion, removal, and change of objects of interest through the comparison of a first image and a second image containing a common area of interest includes performing a scene registration including aligning image patterns in the first image to those in the second image; performing a feature content analysis to determine a likelihood of change for each pixel in the first and second images; performing a region identification to group pixels within the first and second images into one or more image regions based upon their likelihood of change; and performing an image region partitioning to prioritize the one or more image regions according to an image region score for each of the one or more image regions, the image region score being indicative of at least one of insertion, removal, and change of an object of interest within the common area of interest.

In a further embodiment, a method for detecting at least one of insertion, removal, and change of objects of interest through the comparison of a first image and a second image containing a common area of interest includes determining a likelihood of change for each of a plurality of portions of the first and second images; grouping the plurality of portions into one or more image regions based upon their likelihood of change; and prioritizing the one or more image regions according to an image region score for each of the one or more image regions, the image region score being indicative of at least one of insertion, removal, and change of an object of interest within the common area of interest.

In yet another embodiment, an image analysis system for detecting at least one of insertion, removal, and change of objects of interest through the comparison of a first image and a second image containing a common area of interest includes a first component configured to determine a likelihood of change for a plurality of portions of the first and second images; a second component configured to group the plurality of portions into one or more image regions based upon their likelihood of change; and a third component configured to prioritize the one or more image regions according to an image region score for each of the one or more image regions, the image region score being indicative of at least one of insertion, removal, and change of an object of interest within the common area of interest.

BRIEF DESCRIPTION OF THE DRAWINGS

Embodiments of the present invention are described in detail below with reference to the following drawings.

DETAILED DESCRIPTION

The present invention relates to systems and methods for detecting the insertion, removal, and change of objects of interest through the comparison of two or more images containing a common area of interest. Many specific details of certain embodiments of the invention are set forth in the following description and in FIGS. 1 through 16 to provide a thorough understanding of such embodiments. One skilled in the art, however, will understand that the present invention may have additional embodiments, or that the present invention may be practiced without several of the details described in the following description.

In general, embodiments of systems and methods for detecting the insertion, removal, and change of objects of interest through a comparison of two or more images containing a common area of interest in accordance with the present invention may identify and prioritize image regions within the images based on changes in feature content over a period of time in a manner which is consistent with the insertion, removal and change of an object of interest, such as an Improvised Explosive Device (IED), or for detecting new facilities, capabilities, movements, or strategic thrusts by hostile parties, or for various non-military applications. Such embodiments may advantageously detect relevant changes in feature content within images which have dissimilar sensor view points, sensor spectrums, scene composition, or period of time covered by the imagery.

Figure 1:
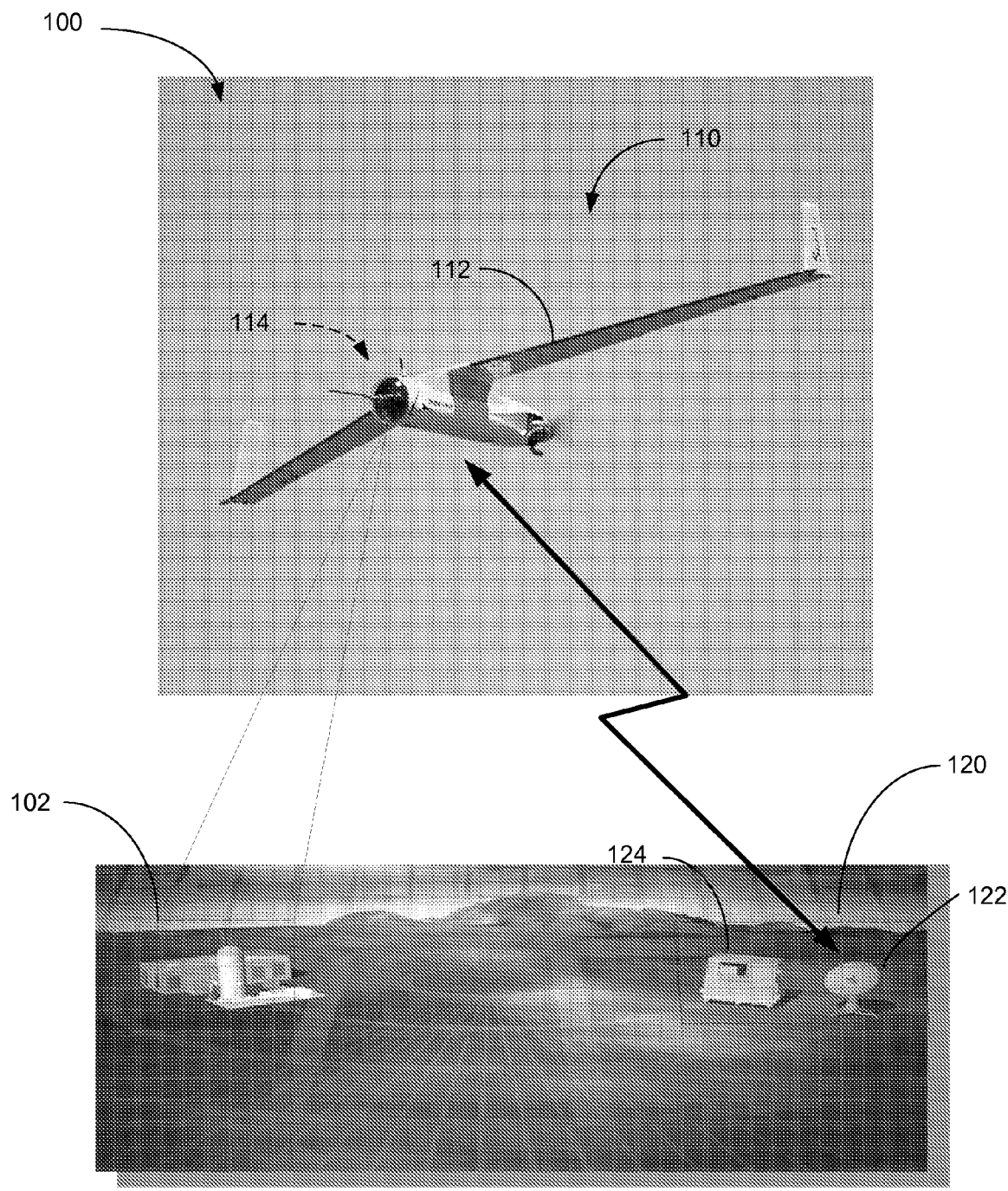
FIG. 1 is an image collection and analysis system in accordance with an embodiment of the present invention.
Figure 2:
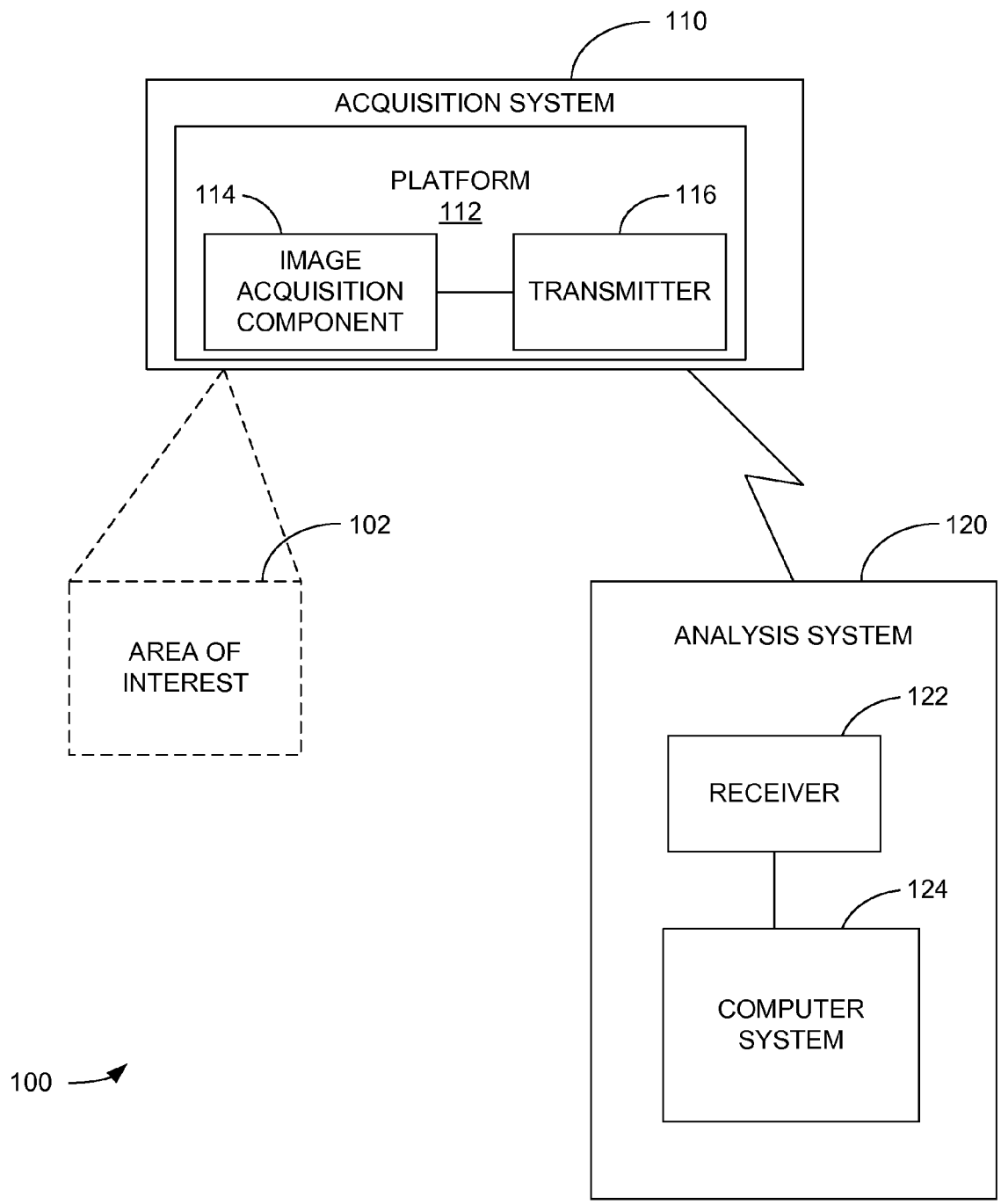
FIG. 2 is a schematic representation of the image collection and analysis system of FIG. 1.

FIG. 1 is an image collection and analysis system 100 in accordance with an embodiment of the present invention. FIG. 2 is a schematic representation of the image collection and analysis system 100 of FIG. 1. In this embodiment, the system 100 includes an acquisition system 110 and an analysis system 120. The acquisition system 110 includes a platform 112 having an image acquisition component 114 coupled to a transmitter 116. In the embodiment shown in FIG. 1, the platform 112 is an aircraft, and more specifically an Unmanned Aerial Vehicle (UAV). In alternate embodiments, the platform 112 may be any suitable stationary or moveable platform. Similarly, the image acquisition component 114 may be any suitable type of image acquisition device, including, for example, visible wavelength sensors (e.g. photographic systems), infrared sensors, laser radar systems, radar systems, or any other suitable sensors or systems. In the embodiment shown in FIGS. 1 and 2, the analysis system 120 includes a receiver 122 coupled to a computer system 124. The computer system 124 is configured to perform a method of detecting changes between images in accordance with embodiments of the present invention, as described more fully below. A particular embodiment of a suitable computer system 124 is described more fully below with reference to FIG. 13.

In operation, the acquisition system 110 is positioned such that the image acquisition component 114 may acquire one or more images of an area of interest 102. The one or more images may be transmitted by the transmitter 116 to the receiver 122 of the analysis system 120 for processing by the computer system 124. Thus, images of the area of interest 102 may be provided by the acquisition system 110 in a real-time manner to the analysis system 120. In alternate embodiments, the transmitter 116 and receiver 122 may be eliminated, and the images acquired by the image acquisition component 114 may be communicated to the computer system 124 either directly via a direct signal link, or may be stored within a suitable storage media (e.g. RAM, ROM, portable storage media, etc.) by the image acquisition component 114 and uploaded to the computer system 124 at a later time.

Figure 16:
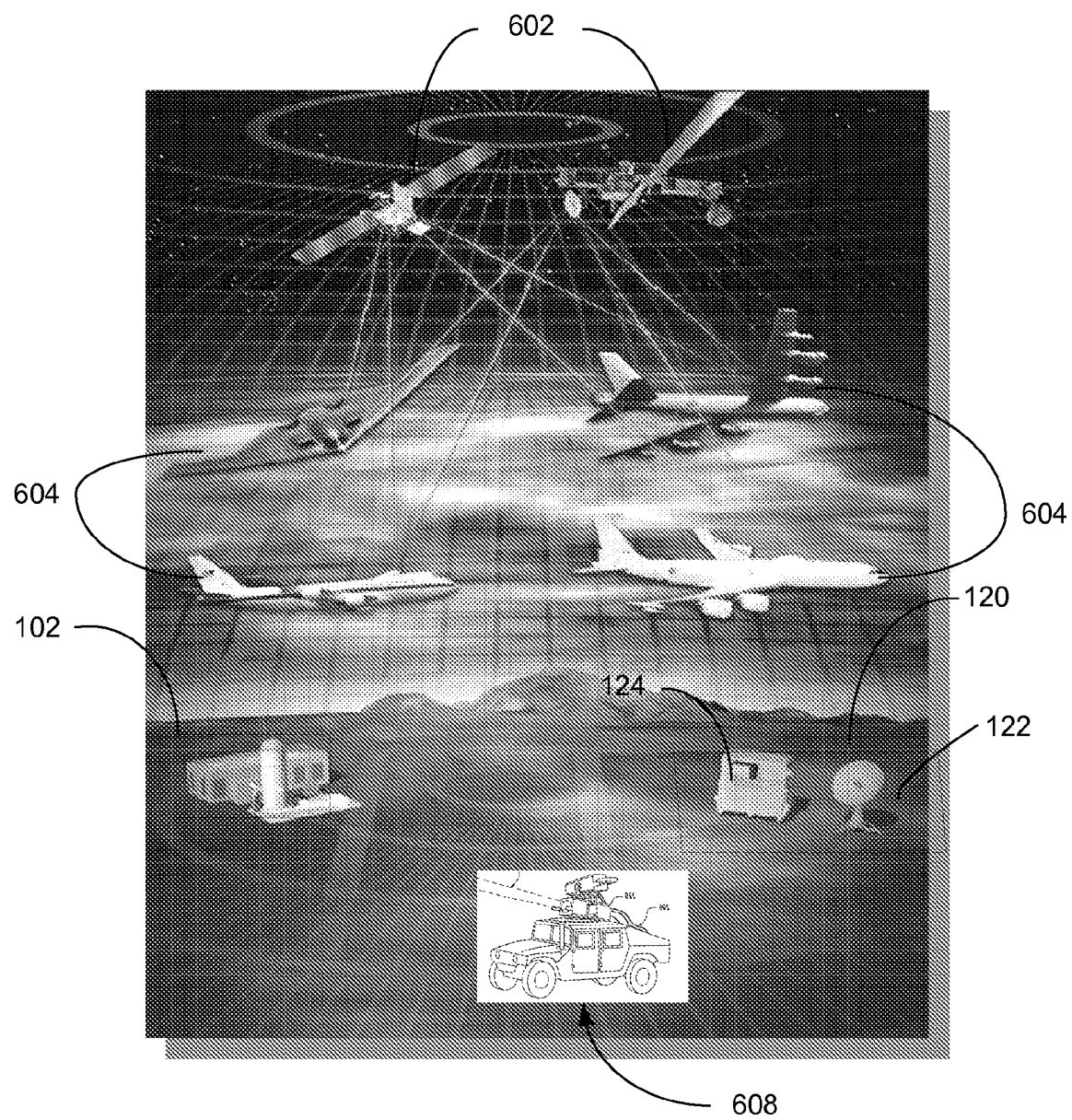
FIG. 16 shows a variety of sensor platforms that may be used in systems in accordance with alternate embodiments of the invention

Although the image collection and analysis system 100 shown in FIG. 1 is depicted as having a platform 112 that is an Unmanned Aerial Vehicle (UAV), it will be appreciated that a variety of alternate embodiments of acquisition systems may be conceived, and that the invention is not limited to the particular embodiment described above. For example, FIG. 16 shows a variety of sensor platforms that may be used in place of the UAV 112 in image collection and analysis systems in accordance with alternate embodiments of the invention. More specifically, in alternate embodiments, sensor platforms may include satellites or other space-based platforms 602, manned aircraft 604, land-based vehicles 608, or any other suitable platform embodiments.

Figure 3:
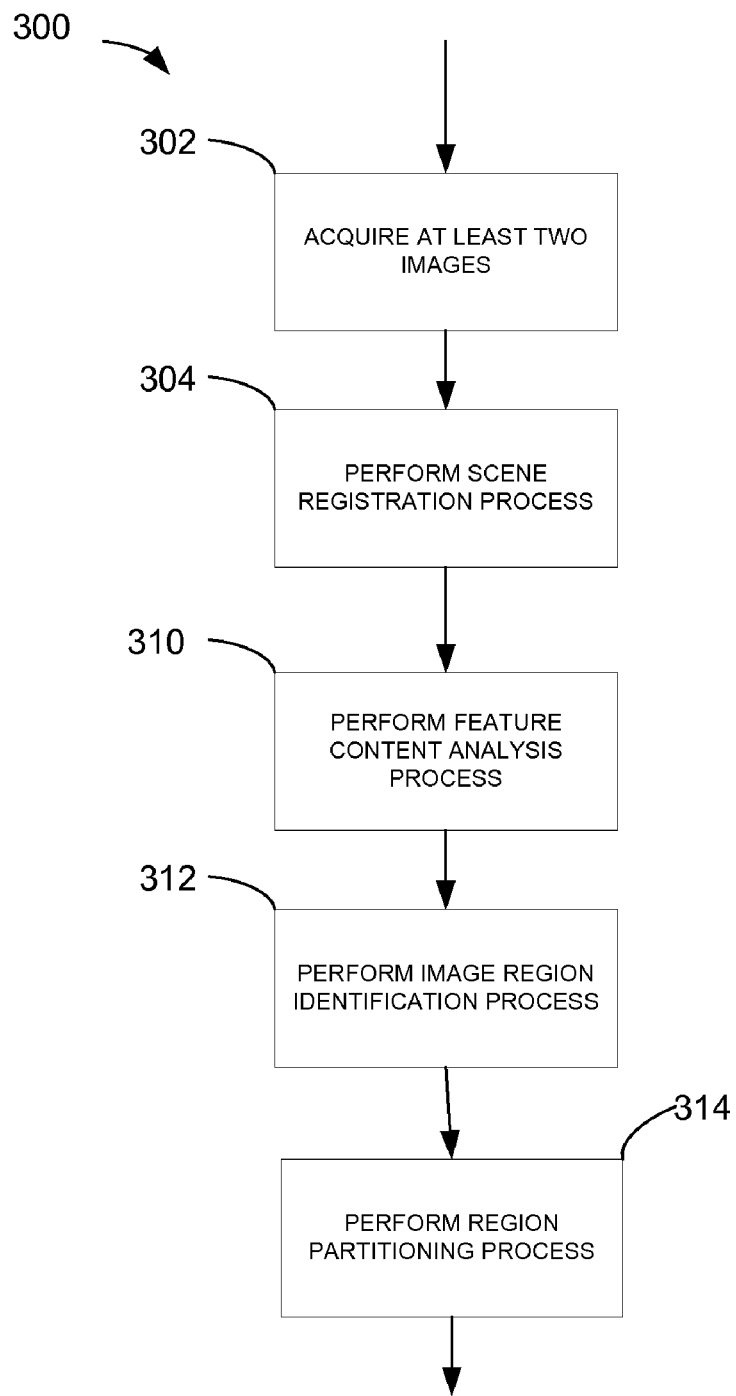
FIG. 3 is a flowchart of a method of detecting the insertion, removal and change of an object of interest through two images containing a common area of interest in accordance with an embodiment of the present invention.

FIG. 3 is a flowchart of a method 300 of detecting the insertion, removal, and change of objects of interest through the use of two or more images containing a common area of interest in accordance with an embodiment of the present invention. In the following discussion, exemplary methods and processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Furthermore, removal of one or more of the listed operations, or the addition of additional operations, does not depart from the scope of the invention.

As shown in FIG. 3, in this embodiment, the method 300 includes acquiring at least two images at a block 302. One or more of the images may be stored images that have been acquired in the past and are retrieved from a suitable storage media, or may be images that are acquired in a real-time manner. The images may be acquired using similar or dissimilar (i.e. cross-spectral) sensor types, including visible wavelength sensors (e.g. photographic systems), infrared sensors, laser radar systems, radar systems, or any other suitable sensors or systems. At a block 304, a scene registration process is performed. The scene registration process 304 aligns all of the pixels representing a physical area which is common to the first and second images. In one particular set of embodiments, the scene registration process (block 304) comprises some or all of the acts described, for example, in U.S. Pat. Nos. 5,809,171, 5,890,808, 5,946,422, 5,982,930, 5,982,945 issued to Neff et al., which patents are incorporated herein by reference.

Figure 4:
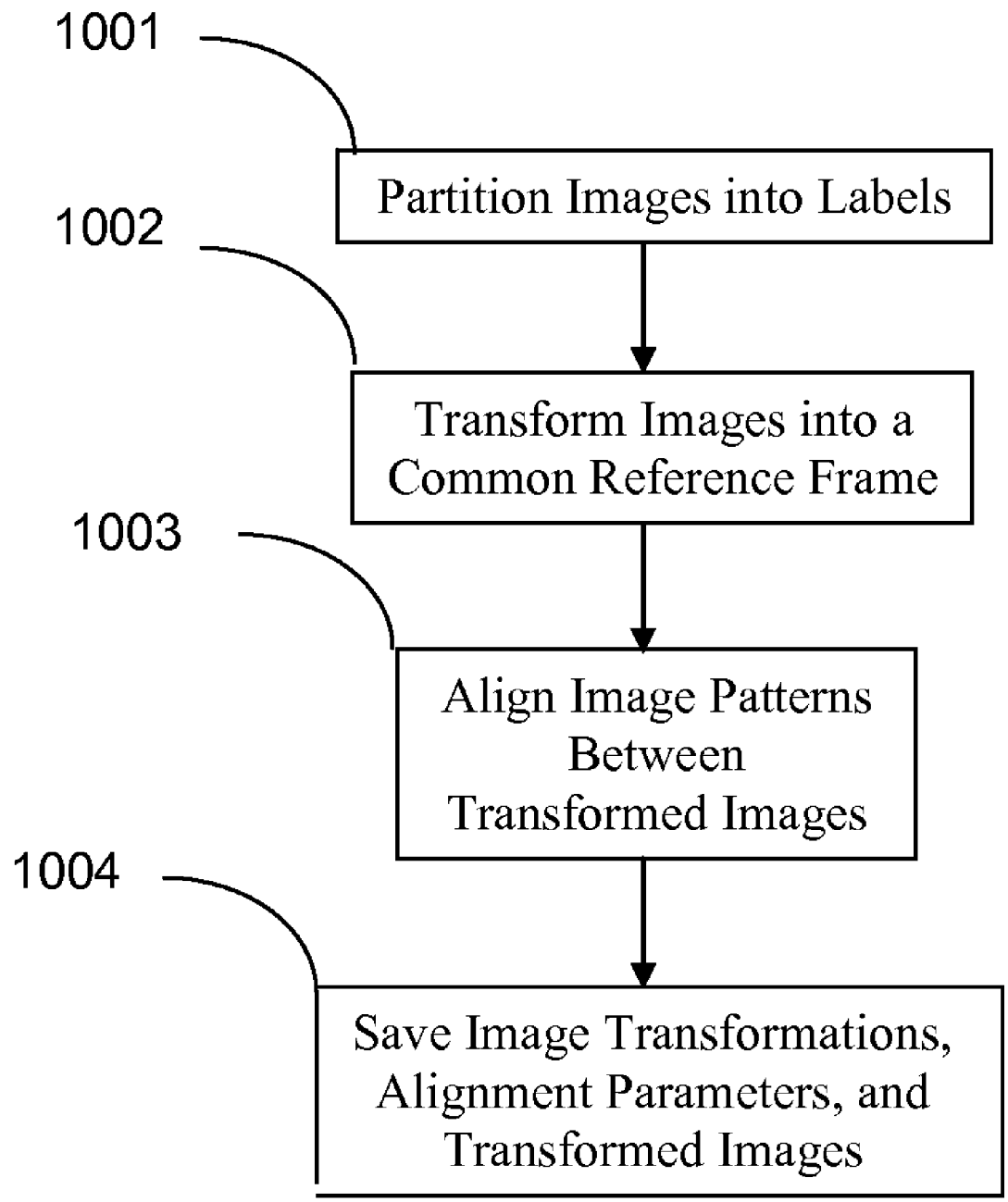
FIG. 4 is a flowchart of a scene registration process in accordance with an embodiment of the present invention.
Figure 5:
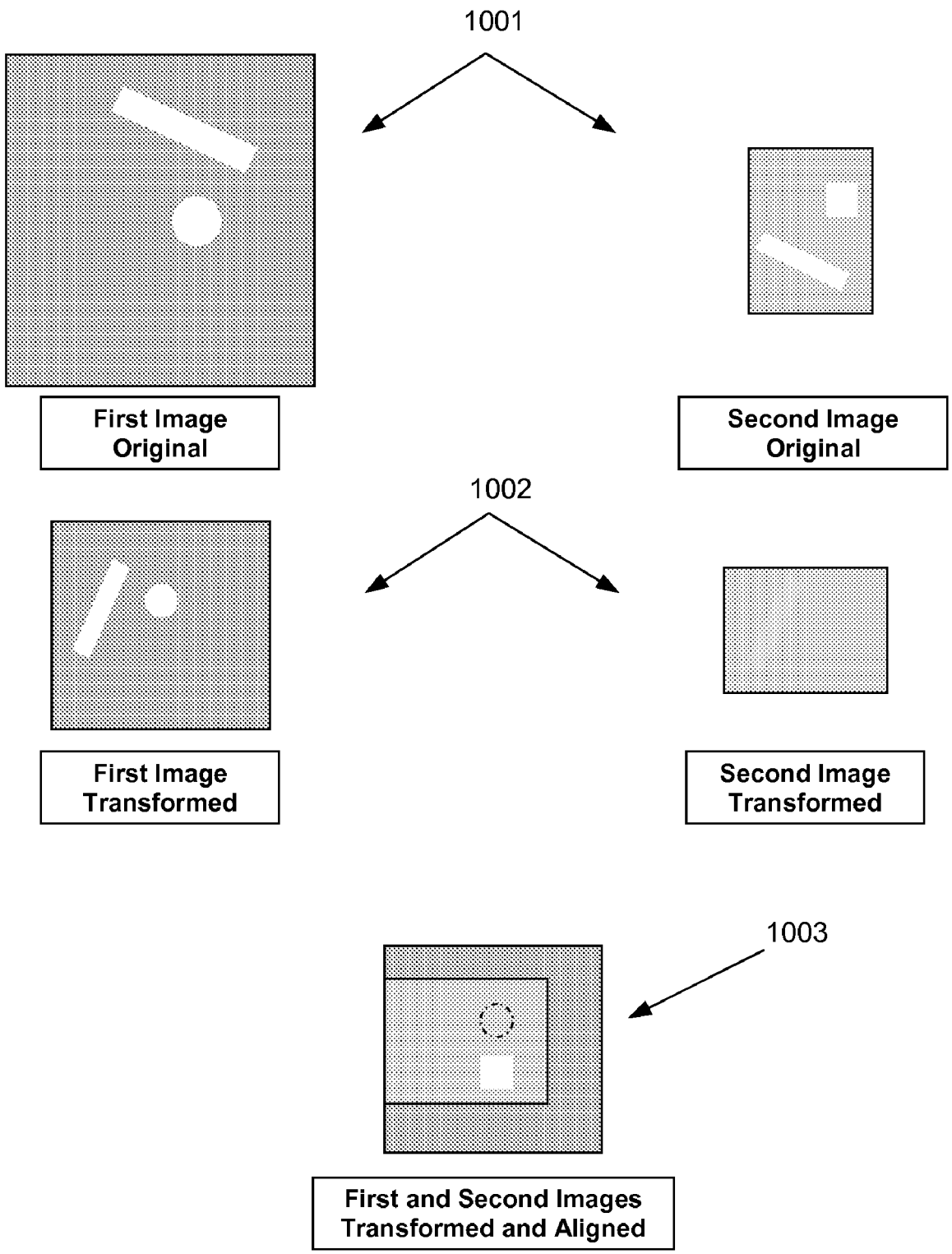
FIG. 5 shows a sample pair of first and second images, their transformed counterparts, and an alignment of the transformed images typically produced by the scene registration process of FIG. 4.

Alternately, in another embodiment, the scene registration process 304 includes the acts shown in FIGS. 4 and 5. Again, it will be appreciated that the order in which the scene registration process 304 is described is not intended to be construed as a limitation, and any number of the described method blocks can be combined in any order to implement the method, or an alternate method. In this embodiment, the image pixel values are partitioned into a set of labels at a block 1001. This process may include all of the one to one and many to one pixel value transformations such as linear rescaling, equalization, and feature extraction. At a block 1002 the original or re-labeled images are transformed into a common reference frame and may produce both a forward and inverse transform which maps the pixel locations in the original image to those in the transformed image and vice versa. The common reference frame may be the original view point of either image or another advantageous view point all together.

At block 1003 the image patterns of the transformed images are aligned and may produce either a mathematical transform or a set transformed images or both, that account for all of the spatial effects due to translation, rotation, scale, and skew, any spectral artifacts such as shadowing and layover, and other distortions present within the transformed images that were not removed by the previous blocks such as terrain elevation and object height errors. When produced, all of the transformations, transformed images, and alignment parameters are saved at a block 1004 for use in the feature content analysis process (block 310).

With continued reference to FIG. 3, the method 300 further includes a feature content analysis process at a block 310. The feature content analysis process 310 indicates how the image features representing a common physical location have changed over time. The feature content analysis process 310 uses the mathematical transformations and/or the transformed images produced in FIG. 4. In one embodiment, the feature content analysis process 310 may use a General Pattern Change (GPC) likelihood algorithm, such as the GPC likelihood process 2014 schematically shown in FIG. 6 to determine the likelihood of change for every pixel in the first and second images.

Figure 6:
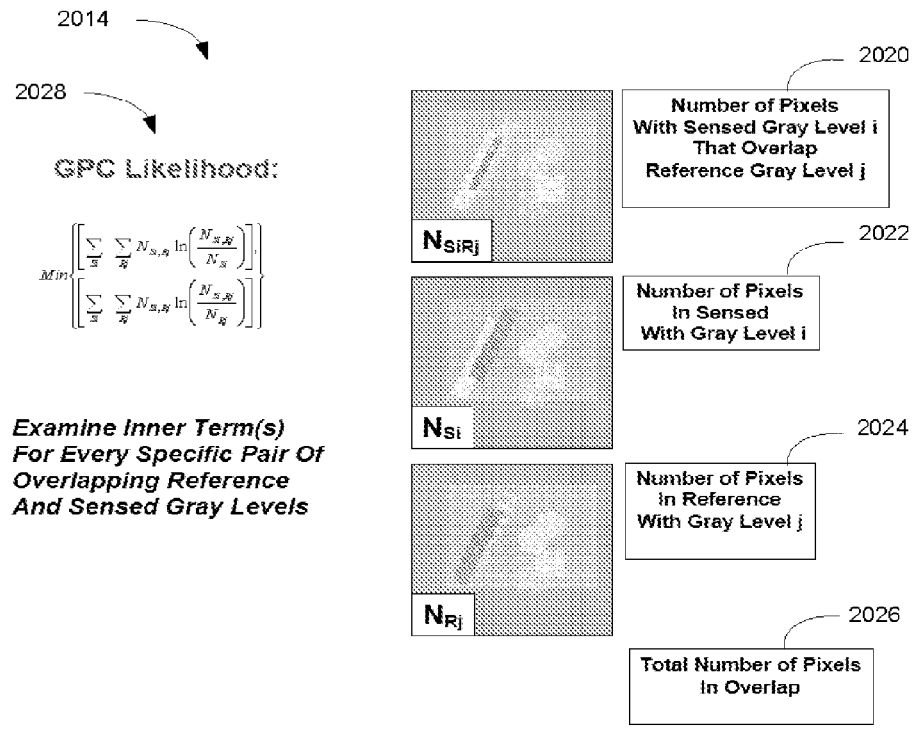
FIG. 6 shows the development of the General Pattern Change likelihood in accordance with an embodiment of the invention.

FIG. 6 shows a development of a General Pattern Change (GPC) likelihood in accordance with an embodiment of the invention. Equation 1 below is an example of a GPC likelihood 2028.

$$\text{Min}\left\{\left[\sum_{Si}\sum_{Rj}N_{Si,Rj}\ln\left(\frac{N_{Si,Rj}}{N_{Si}}\right)\right],\left[\sum_{Si}\sum_{Rj}N_{Si,Rj}\ln\left(\frac{N_{Si,Rj}}{N_{Rj}}\right)\right]\right\} \quad (1)$$

In the embodiment shown in FIG. 6, the GPC likelihood process includes determining the number of occurrences where a pixel having value i in the common image overlap area of the sensed image overlaps a pixel having value j in the common image overlap area of the reference image, for all of the pixel values within the common image overlap area at a block 2020. At a block 2022, a number of pixels in the common image overlap area of the sensed image having value i is determined, and a number of pixels in the common image overlap area of the reference image having gray level j is determined at a block 2024. Next, a total number of pixels in the common image overlap is determined at a block 2026.

Figure 7:
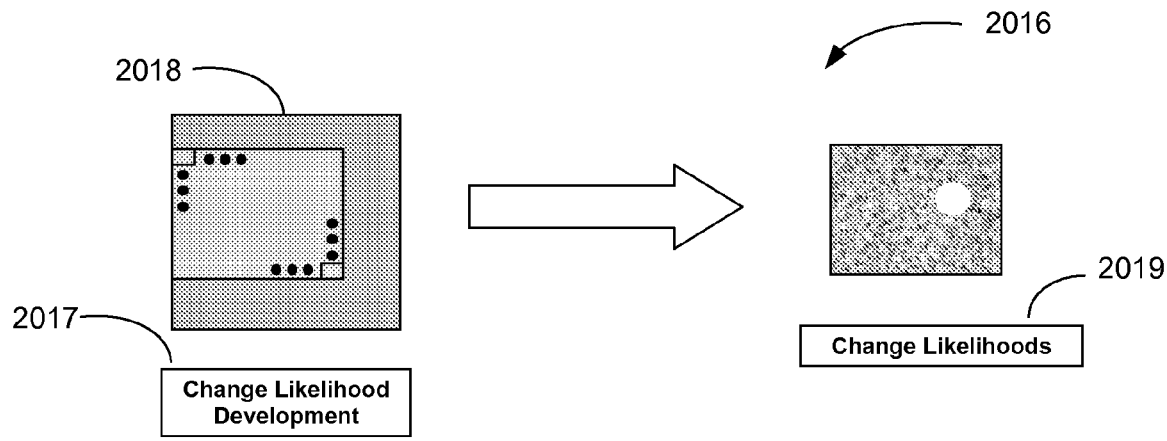
FIG. 7 shows the development of the GPC likelihoods over the common area between the two transformed and aligned images shown in FIG. 5 in accordance with an embodiment of the invention.

In one embodiment, the likelihood of change for every pixel in the first and second image is determined by calculating the GPC likelihood using the pixels within an object of interest sized polygon centered on each corresponding pixel in the first and second image. In an alternate embodiment, where the object of interest sized polygon is not know a-priori, the likelihood of change for every pixel in the first and second image is determined by calculating the GPC likelihood using the pixels within a minimally sized polygon centered on each corresponding pixel in the first and second image. FIG. 7 schematically shows a GPC likelihood process 2016 where the polygon is either minimally sized or the size of an object of interest (block 2018) in accordance with alternate embodiments of the present invention. As shown in FIG. 7, the object of interest sized polygon can be a simple rectangle.

Furthermore, in FIG. 7, the GPC likelihood is calculated (block 2017) for a pixel location within the transformed and aligned versions of the first and second images using the pixels within a rectangle centered on the pixel location. This process is repeated for every pixel location within an area which is common to the first and second images to produce a set of GPC likelihoods (block 2019).

Figure 8:
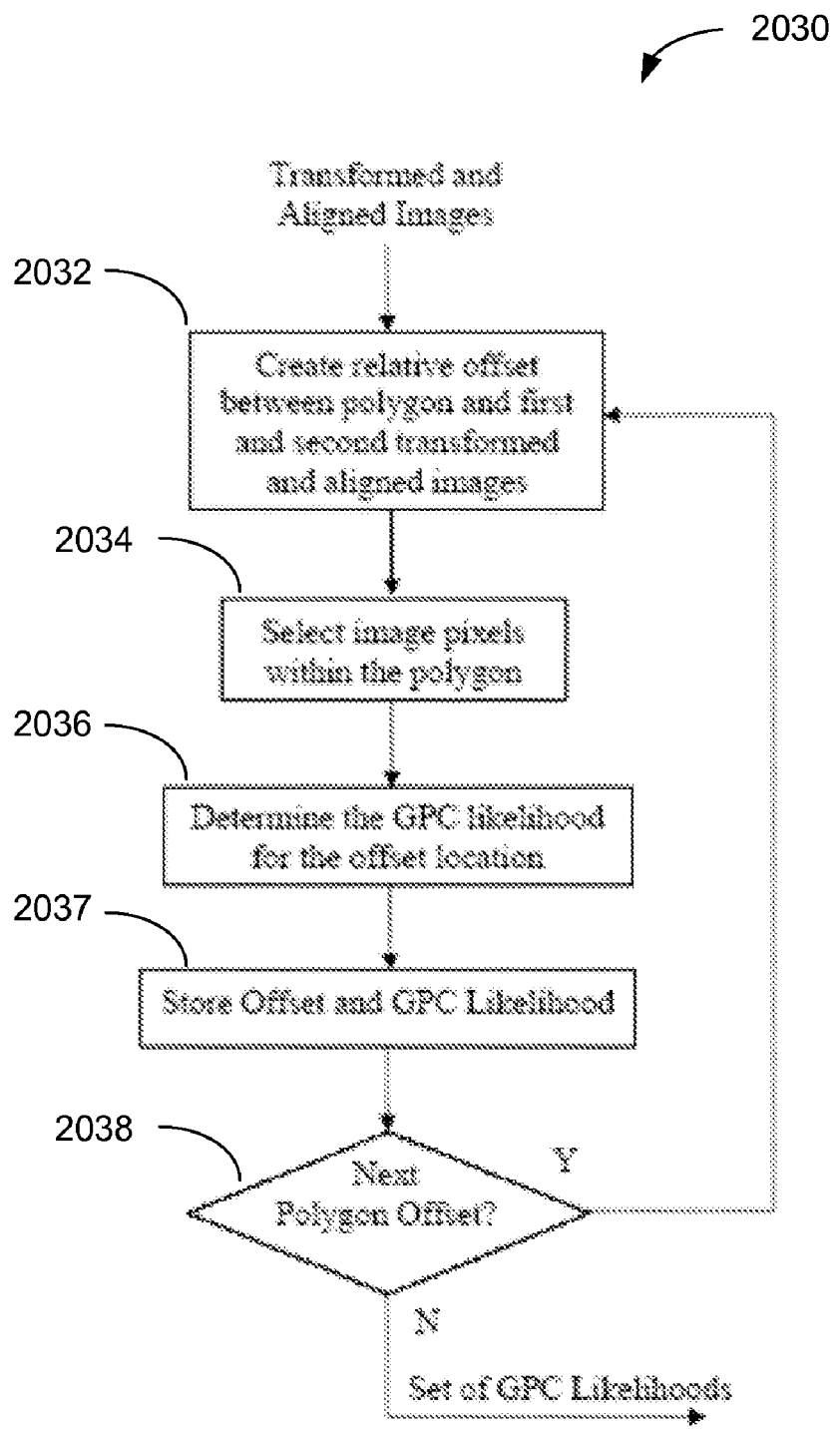
FIG. 8 is a flowchart of a GPC likelihood development process shown in FIG. 7 in accordance with an embodiment of the invention.

As shown in FIG. 8, the GPC likelihood process 2030 receives a data set from the scene registration process 304 (either the mathematical transformations and/or the transformed images produced in FIG. 4). At a block 2032, in one embodiment the center of a minimally sized neighborhood polygon is placed at an offset location relative to the transformed and aligned imagery, one of the set of offset locations which encompass the common image overlap. In an alternate embodiment, the center of an object of interest sized neighborhood polygon is placed at an offset location relative to the transformed and aligned imagery, one of the set of offset locations which encompass the common image overlap. At a block 2034, the image pixels from the transformed and aligned imagery that are within the polygon at the current offset are selected. At a block 2036, the GPC likelihood is determined for the selected pixels. At a block 2037, the offset and the GPC likelihood are stored. At a block 2038, the next polygon offset is selected if any additional offsets remain in the set of offsets. Otherwise the process is completed and the set of GPC likelihoods are available for use.

As further shown in FIG. 3, at a block 312, an image region identification process is performed which groups the GPC likelihoods into regions. More specifically, the region identification process 312 spatially partitions the set of GPC likelihoods, created by the feature content analysis process, into a set of variously sized regions where the region sizes are determined by the objects within the imagery. In an embodiment, shown in FIG. 9, where the approximate size of the object of interest is known a-priori, a region score may be determined for each location by applying a region scoring function to all of the GPC likelihoods within an object-sized polygon centered on each location. In an alternate embodiment, shown in FIG. 10, where the object of interest size is not known a-priori, a region score may be determined for each location by applying a scoring function to all of the GPC likelihoods within each polygon from a set of polygons with various shapes and sizes. In either embodiment, the resulting regions which overlap by more than a pre-defined amount can be removed by selecting those with the larger region score.

Figure 9:
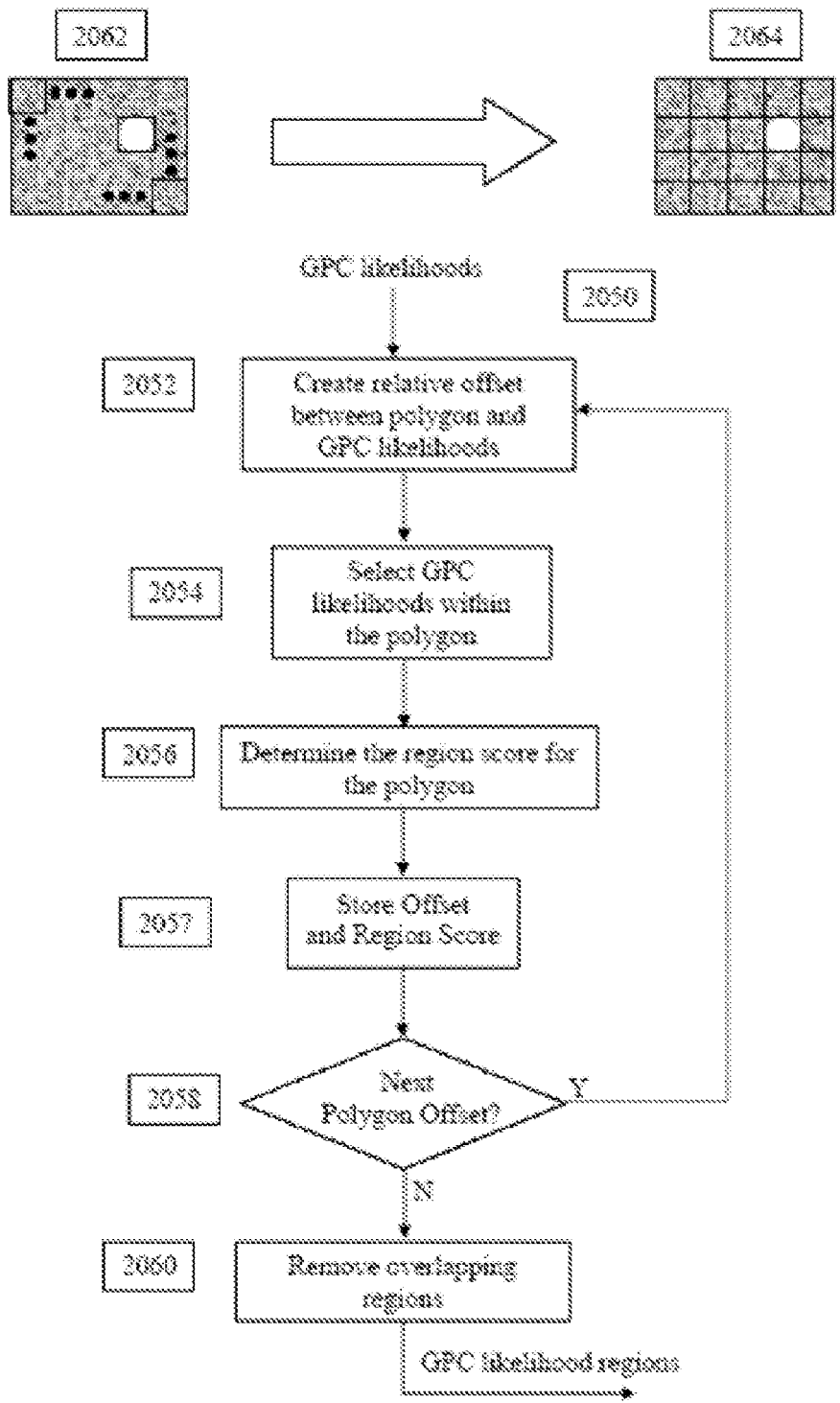
FIG. 9 is a flow chart of the region identification process for an embodiment where the object of interest size is known a-priori.

Alternately, FIG. 9 is a flow chart 2050 of a region identification process in accordance with an alternate embodiment of the invention. The region identification process 2050 may be used with a polygonal shape 2062 that remains constant over the entire data set (e.g. a transformed image) 2064, as shown in the upper portion of FIG. 9. In this embodiment, the region identification process 2050 includes creating a relative offset between the polygonal shape and the GPC likelihoods at a block 2052. GPC likelihoods within the polygonal shape are selected at a block 2054. At a block 2056, the region score for the polygonal shape at the offset location is determined. At a block 2057, the polygon offset location and the region score are stored. At a determination block 2058, a determination is made whether the region scores have been determined across the entirety of the data set, or whether another offset is needed. If another offset is needed, then the process 2050 stores the offset and region score at a block 2060, and repeats the actions described in blocks 2052 through 2056 for a next offset value. If another offset is not needed, then the process 2050 removes overlapping regions at a block 2062, and makes the non-overlapping regions available.

The scoring function used to determine each region score (block 2056) may calculate any meaningful statistic such as an average, a maximum, or a standard deviation. In a more general embodiment shown in FIG. 10, the set of GPC likelihoods is spatially partitioned into an arbitrarily shaped set of polygonal regions having dimensions less than or equal to the dimensions of the common area of interest based on the spatial placement, grouping, size, or any statistical grouping of the GPC likelihoods using, in one particular embodiment, the Region Partitioning likelihood 2012 shown in Equation 2 and also in FIG. 11. After the regions have been assigned and their scores determined, all regions that overlap more than a predefined amount with an image region having a larger region score are then removed.

Figure 10:
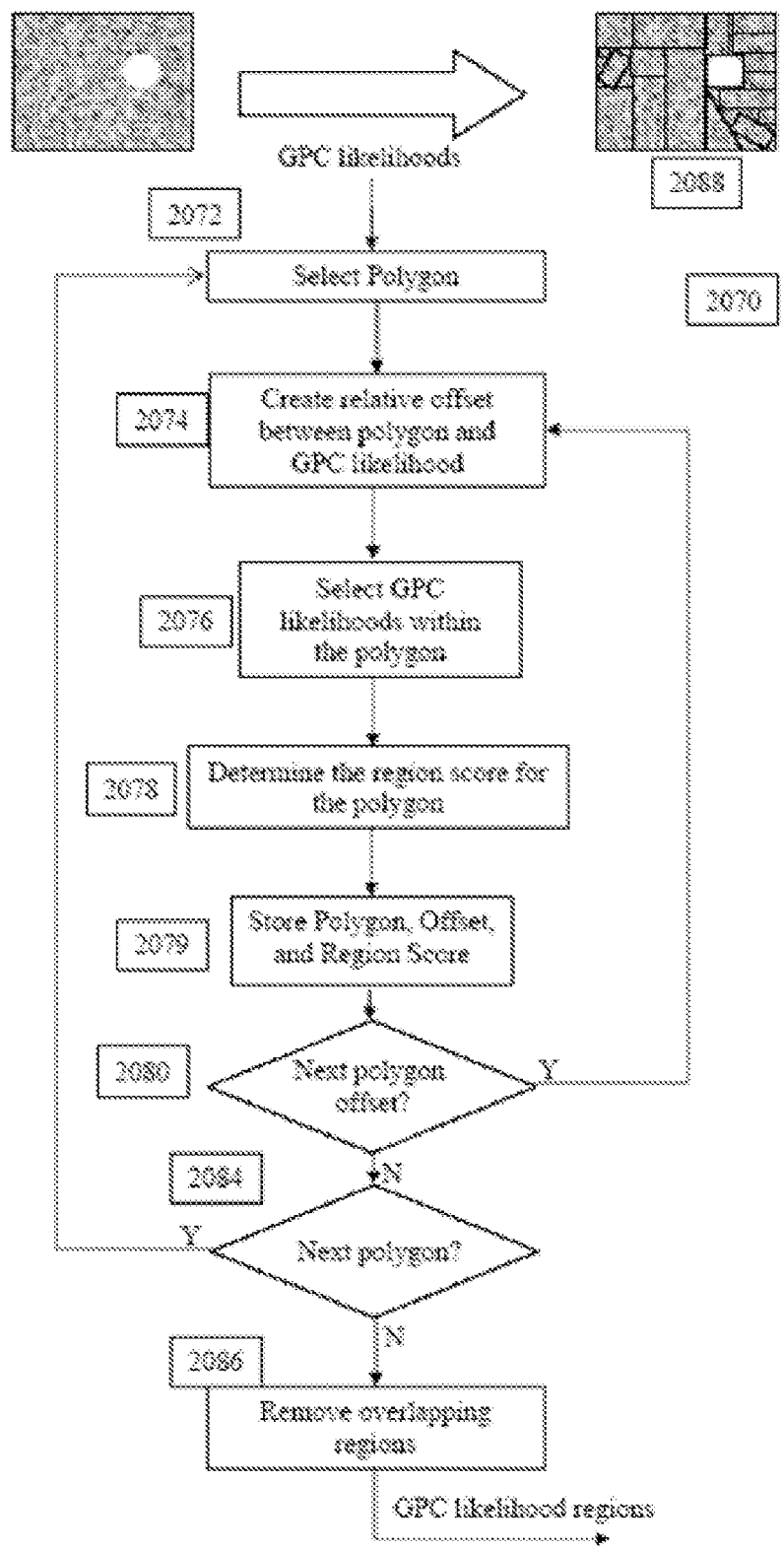
FIG. 10 is a flow chart of the region identification process for an embodiment where the object of interest size is not known a-priori.

More specifically, FIG. 10 is a flow chart 2070 of an embodiment of a region identification process in which the polygonal shape does not remain constant over the entire data set 2088, as shown in the upper portion of FIG. 10. In this embodiment, the region identification process 2070 includes selecting a polygonal shape at a block 2072, and creating a relative offset between the polygonal shape and the GPC likelihood at a block 2074. GPC likelihoods within the polygonal shape are selected at a block 2076. At a block 2078, the region score for the polygonal shape at the offset location is determined. At a block 2079, the polygon, the offset and the region score are stored. At a determination block 2080, a determination is made whether the region scores have been determined across the entirety of the data set, or whether another offset is needed. If another offset is needed, then the process 2070 repeats the actions described in blocks 2074 through 2080 for a next offset value. If another offset is not needed, then the process 2070 proceeds to a determination block 2084, where a determination is made whether another polygonal shape is to be analyzed. If so, the process 2070 returns to block 2072, selects another polygonal shape, and repeats blocks 2074 through 2084. Eventually, once it is determined at block 2084 that there are no additional polygonal shapes to analyze, the process 2070 removes overlapping regions at a block 2086, and ends.

Figure 11:
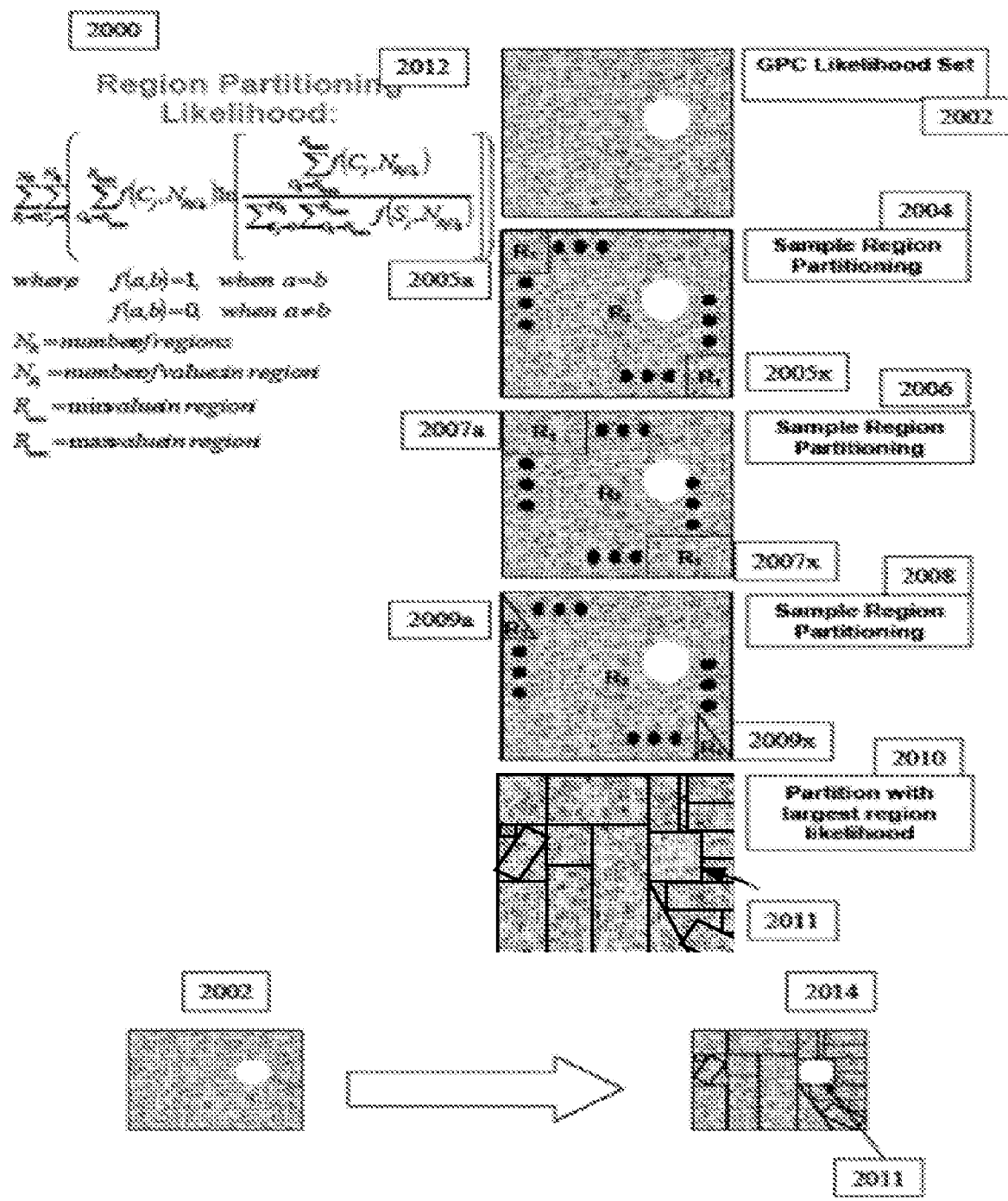
FIG. 11 shows the development of the region partitioning likelihood in accordance with an embodiment of the present invention.

As shown in FIG. 11, in this embodiment, the region partitioning process 2000 receives a set of GPC likelihoods from the feature analysis process 310 at a block 2002. At a block 2004, the GPC likelihood region partitioning process 2000 performs a first sample region partitioning process. The first sample region partitioning process 2004 includes selecting a first polygonal shape $R_1$, placing the first polygonal shape $R_1$ at a first location 2005a, and computing the GPC likelihood at the first location 2005a according a known region partitioning likelihood expression 2012, as shown below in Equation (2):

$$\sum_{R_i=0}^{N_R} \sum_{C_j=0}^{N_{Ri}} \left( \left[ \sum_{G_k=R_{i_{min}}}^{R_{i_{max}}} f(C_j, N_{R_iG_k}) \right] \ln \left[ \frac{\sum_{G_k=R_{i_{min}}}^{R_{i_{max}}} f(C_j, N_{R_iG_k})}{\sum_{S_j=0}^{N_{Ri}} \sum_{G_k=R_{i_{min}}}^{R_{i_{max}}} f(S_j, N_{R_iG_k})} \right] \right) \quad (2)$$

Where $f(a,b)=1$, when $a=b$
$f(a,b)=0$, when $a \neq b$
$N_R$=number of regions
$N_{Ri}$=number of values in region i
$R_{i_{min}}$=minimum value in region i
$R_{i_{max}}$=maximum value in region i The first sample region partitioning process 2004 continues successively positioning the first polygonal shape $R_1$ and computing the region partitioning likelihood at all successive locations 2005a-2005x across the data set. Similarly, a second sample region partitioning process (block 2006) selects a second polygonal shape $R_2$, and successively positions the second polygonal shape $R_2$ and computes the region partitioning likelihood at all successive locations 2007a-2007x across the data set. The region partitioning likelihood process 2000 continues in this manner through an $n^{th}$ sample region partitioning process 2008 in which an $n^{th}$ polygonal shape $R_n$ is positioned and the region partitioning likelihood is computed at all successive locations 2009a-2009x across the data set.

Referring again to FIG. 11, following the region partitioning processes 2004, 2006, 2008, a partition 2011 with a largest region likelihood is determined at a block 2010. At a block 2014, the data set is then partitioned into a mosaic of various regions of GPC likelihood (2014) based on the region partitioning processes 2004, 2006, 2008. In an alternate embodiment, a segmentation process could be used to perform the partitioning of the data set into a mosaic of various regions.

Figure 12:
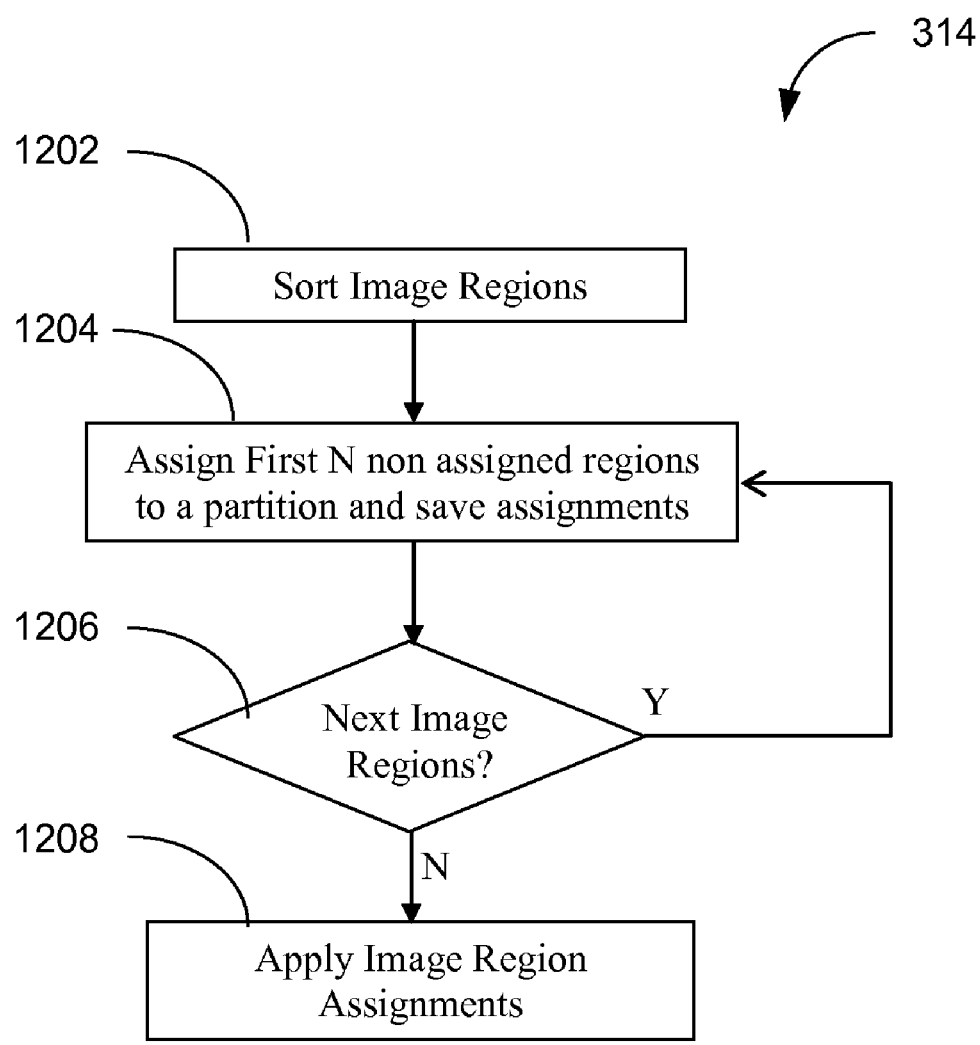
FIG. 12 and FIG. 13 are flow charts of the region prioritization process for alternate embodiments in accordance with the present invention.

Referring again to FIG. 3, a region partitioning process is performed at a block 314. The region partitioning process 314 partitions the image regions produced by the image region identification process 312 into a set of partitions according to their image region scores. In one embodiment, as shown in FIG. 12, the region partitioning process 314 sorts the image regions in descending order according to their image region scores at a block 1202. The process 314 then assigns the first N sorted image regions into one partition at a block 1204, determines whether a next partition of image regions is needed at a block 1206, and continues sorting the next M sorted regions into another partition and so on until all of the image regions had been assigned. After all image regions have been sorted into partitions, the process 314 applies image region assignments at a block 1208.

Figure 13:
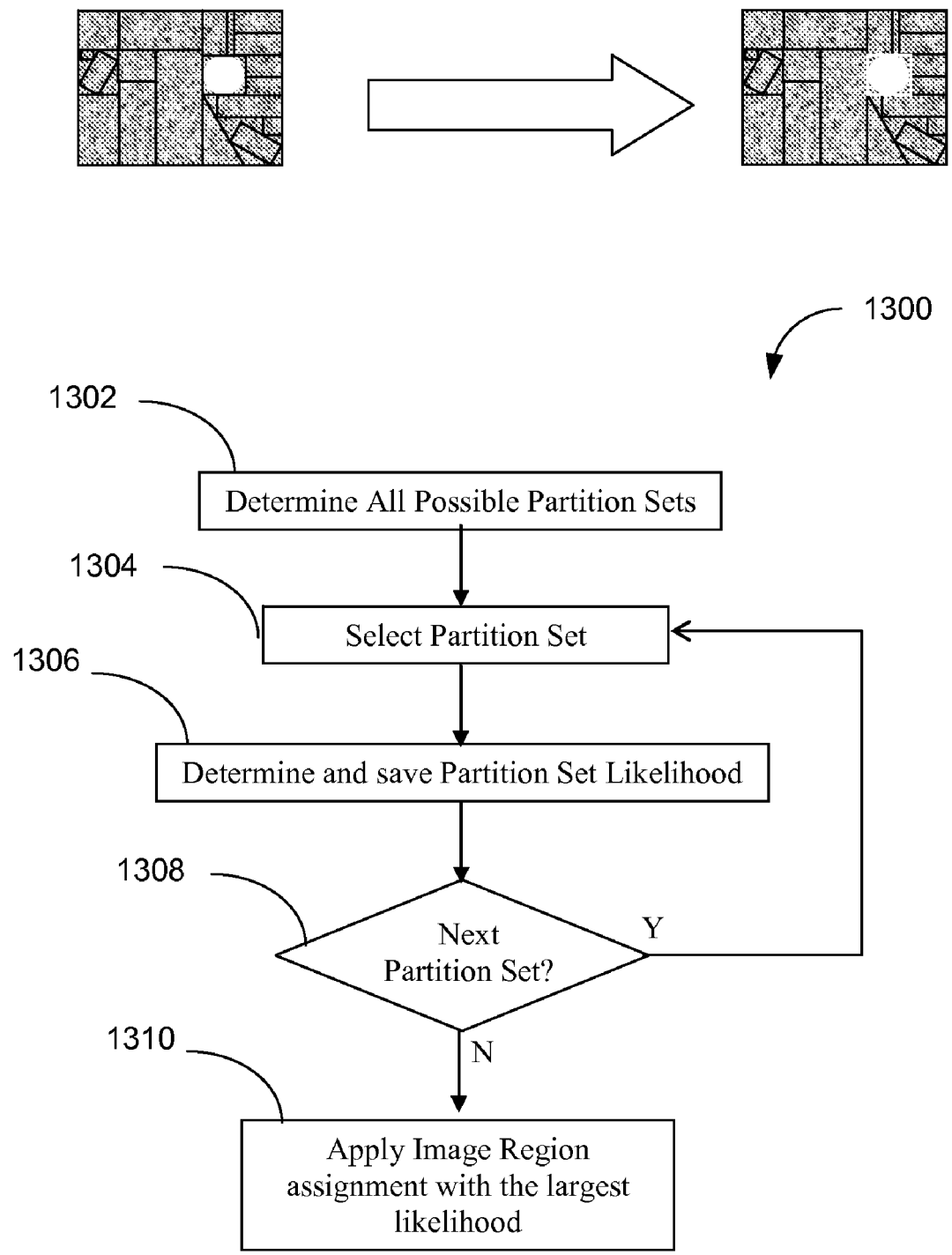
Figure 14:
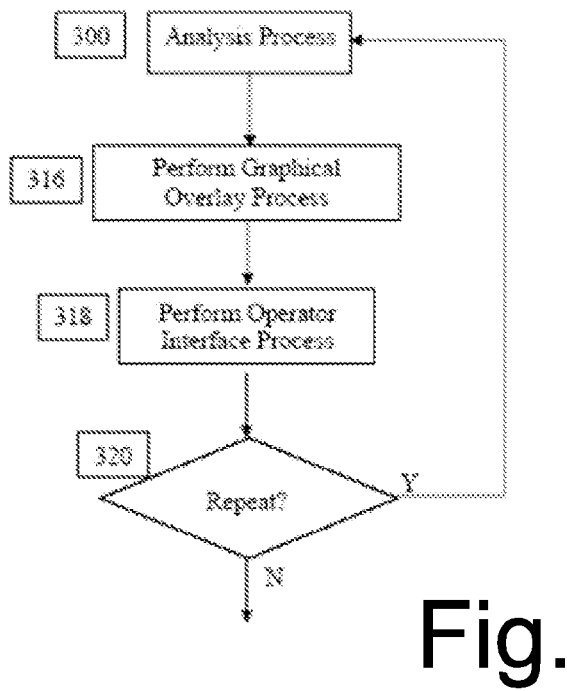
FIG. 14 is a flow chart for an embodiment to assist a human operator in accordance with the present invention.

Alternately, in a more general embodiment as shown in FIG. 13, a region partitioning process 1300 would determine the likelihood for each possible set of image region score partitions and then select the set of partitions with the largest likelihood. In one particular embodiment, the partition set likelihoods would be the region partitioning likelihood 2012 as shown in Equation 2 and in FIG. 11.

More specifically, as shown in FIG. 13, the region partitioning process 1300 determines all possible partition sets at a block 1302, and selects a partition set at a block 1304. The process 1300 then determines a partition set likelihood and saves the likelihood and the associated partitions at a block 1306. At a block 1308, the process 1300 determines whether a next partition set is needed, and if so, returns to block 1304 to select a next partition set, and blocks 1306 through 1308 are repeated. If no additional partition sets are needed, then the process 1300 applies an image region assignment with the largest likelihood at a block 1310.

In an alternate embodiment designed to assist a human operator detect the insertion, removal, and change of an object within a scene through the use of imagery, referring again to FIG. 3 and FIG. 14, after the region partitioning process is performed (block 314), an optional graphical overlay process may be performed at a block 316 to enable visual inspection of the identified prioritized regions of the first and second images. An optional operator interface process may also be performed at a block 318 to enable a user to adjust various parameters of the process 300. Finally, at a block 320, a determination is made whether to repeat the analysis process 300.

Figure 15:
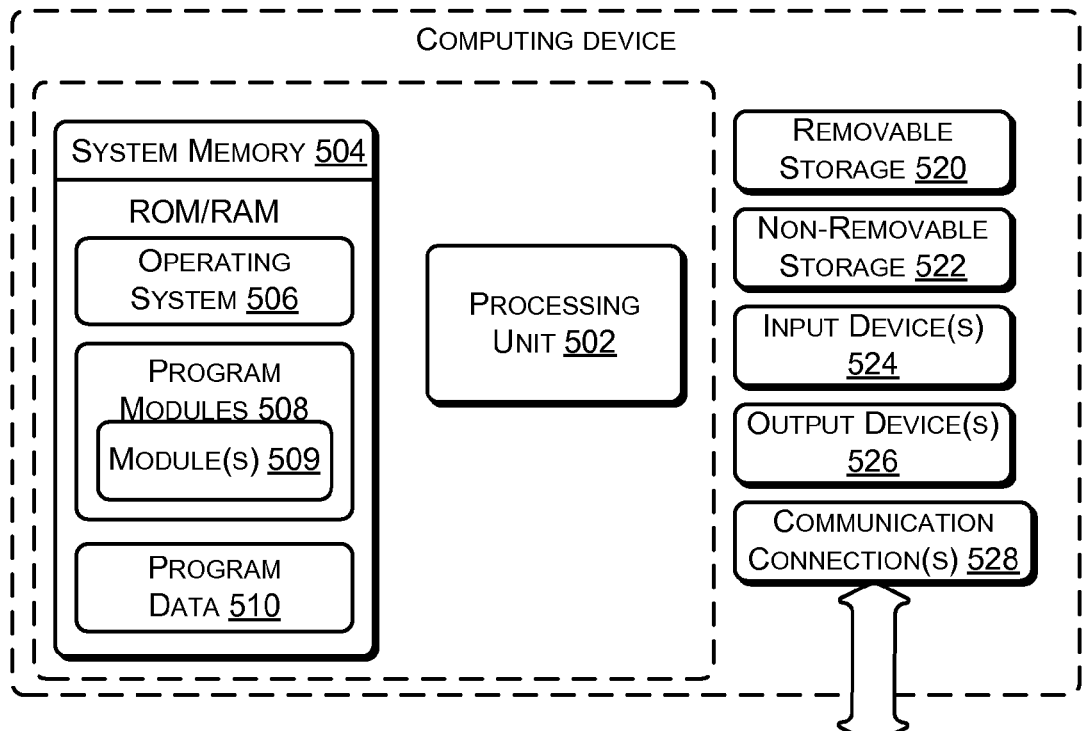
FIG. 15 illustrates a computing device configured in accordance with an embodiment of the present invention.

FIG. 15 illustrates a computing device 500 configured in accordance with an embodiment of the present invention. The computing device 500 may be used, for example, as the computer system 124 of the analysis system 120 of FIG. 1. In a very basic configuration, the computing device 500 includes at least one processing unit 502 and system memory 504. Depending on the exact configuration and type of computing device 500, the system memory 504 may be volatile (such as RAM), non-volatile (such as ROM and flash memory) or some combination of the two. The system memory 504 typically includes an operating system 506, one or more program modules 508, and may include program data 510.

For the present methods of detecting the insertion, removal and change of objects of interest through a comparison of images containing a common area of interest, the program modules 508 may include the process modules 509 that realize one or more the processes described herein. Other modules described herein may also be part of the program modules 508. As an alternative, process modules 509, as well as the other modules, may be implemented as part of the operating system 506, or it may be installed on the computing device and stored in other memory (e.g., non-removable storage 522) separate from the system memory 504.

The computing device 500 may have additional features or functionality. For example, the computing device 500 may also include additional data storage devices (removable and/or non-removable) such as, for example, magnetic disks, optical disks, or tape. Such additional storage is illustrated in FIG. 15 by removable storage 520 and non-removable storage 522. Computer storage media may include volatile and non-volatile, removable and non-removable media implemented in any method or technology for storage of information, such as computer readable instructions, data structures, program modules, or other data. The system memory 504, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well know in the art and need not be discussed at length.

The computing device 500 may also contain a communication connection 528 that allow the device to communicate with other computing devices 530, such as over a network. Communication connection(s) 528 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for detecting insertion, removal, and change of an object of interest through the comparison of a first image and a second image containing a common area of interest, the method comprising using a computing device to identify and prioritize image regions within the images based on changes in feature content over time in a manner that is consistent with the insertion, removal and change of the object of interest, the identification and prioritization including:

performing a scene registration including aligning image patterns in the first image to those in the second image;

performing a feature content analysis to determine a General Pattern Change (GPC) likelihood of change over time for each pixel in the first and second images;

performing a region identification to group pixels within the first and second images into one or more image regions based upon their likelihood of change; and performing an image region partitioning to prioritize the one or more image regions according to an image region score for each of the one or more image regions, the image region score being indicative of insertion, removal, and change over time of an object of interest within the common area of interest.

2. The method of claim 1, wherein performing a scene registration includes transforming at least one of the first and second images into a common reference frame, and aligning image patterns between the transformed first and second images.

3. The method of claim 2, wherein performing a feature content analysis to determine a likelihood of change for each pixel in the first and second images includes determining the GPC likelihood for each pixel in the transformed first and second images.

4. The method of claim 3, wherein determining the GPC likelihood includes determining the GPC likelihood using a GPC algorithm that includes $$\text{Min}\left\{\left[\sum_{Si}\sum_{Rj} N_{Si,Rj}\ \ln\left(\frac{N_{Si,Rj}}{N_{Si}}\right)\right],\ \left[\sum_{Si}\sum_{Rj} N_{Si,Rj}\ \ln\left(\frac{N_{Si,Rj}}{N_{Rj}}\right)\right]\right\}.$$

5. The method of claim 1, wherein performing a feature content analysis to determine a likelihood of change for each pixel in the first and second images includes:
creating a relative offset between a polygonal shape and the first and second images;
selecting one or more one or more pixels within the polygonal shape;
determining a GPC likelihood for the pixel at the center of the polygonal shape; and
repeating the creating, selecting, and determining for a plurality of different relative offsets.

6. The method of claim 5, wherein performing a feature content analysis includes, for a plurality of different polygonal shapes:
creating a relative offset between a polygonal shape and the one or more GPC likelihoods;
selecting one or more one or more pixels within the polygonal shape;
determining a GPC likelihood for the pixel at the center of the polygonal shape; and
repeating the creating, selecting, and determining for a plurality of different relative offsets and polygonal shapes.

7. The method of claim 1, wherein performing an image region partitioning includes performing an image region partitioning using an algorithm that includes:

$$\sum_{R_i=0}^{N_R}\sum_{C_j=0}^{N_{Ri}}\left(\sum_{G_k=R_{i_{min}}}^{R_{i_{max}}} f(C_j, N_{R_iG_k})\ln\left[\frac{\sum_{G_k=R_{i_{min}}}^{R_{i_{max}}} f(C_j, N_{R_iG_k})}{\sum_{S_j=0}^{N_{Ri}}\sum_{G_k=R_{i_{min}}}^{R_{i_{max}}} f(S_j, N_{R_iG_k})}\right]\right)$$

Where f(a,b)=1, when a=b
f(a,b)=0, when a≠b
$N_R$=number of regions
$N_{Ri}$=number of values in region i
$R_{i_{min}}$=minimum value in region i
$R_{i_{max}}$=maximum value in region i.

8. The method of claim 1, wherein performing a region identification includes:
creating a relative offset between a polygonal shape and the one or more GPC likelihoods;
selecting one or more one or more GPC likelihoods within the polygonal shape;
determining a region score for the polygonal shape; and
repeating the creating, selecting, and determining for a plurality of different relative offsets and one or more different polygonal shapes.

9. A method comprising using a computing device to detect at least one of insertion, removal, and change of objects of interest through the comparison of a first image and a second image containing a common area of interest, including:
determining a likelihood of change for each of a plurality of portions of the first and second images;
grouping the plurality of portions into one or more image regions based upon their likelihood of change; and
prioritizing the one or more image regions according to an image region score for each of the one or more image regions, the image region score being indicative of at least one of insertion, removal, and change of an object of interest within the common area of interest.

10. The method of claim 9, wherein prioritizing the one or more image regions includes performing an image region partitioning using an algorithm that includes:

$$\sum_{R_i=0}^{N_R}\sum_{C_j=0}^{N_{Ri}}\left(\sum_{G_k=R_{i_{min}}}^{R_{i_{max}}} f(C_j, N_{R_iG_k})\ln\left[\frac{\sum_{G_k=R_{i_{min}}}^{R_{i_{max}}} f(C_j, N_{R_iG_k})}{\sum_{S_j=0}^{N_{Ri}}\sum_{G_k=R_{i_{min}}}^{R_{i_{max}}} f(S_j, N_{R_iG_k})}\right]\right)$$

Where f(a,b)=1, when a=b
f(a,b)=0, when a≠b
$N_R$=number of regions
$N_{Ri}$=number of values in region i
$R_{i_{min}}$=minimum value in region i
$R_{i_{max}}$=maximum value in region i.

11. The method of claim 9, wherein determining a likelihood of change includes using a GPC algorithm that includes $$\text{Min}\left\{\left[\sum_{Si}\sum_{Rj} N_{Si,Rj}\ \ln\left(\frac{N_{Si,Rj}}{N_{Si}}\right)\right],\ \left[\sum_{Si}\sum_{Rj} N_{Si,Rj}\ \ln\left(\frac{N_{Si,Rj}}{N_{Rj}}\right)\right]\right\}.$$

12. The method of claim 9, wherein determining a likelihood of change includes, for a plurality of different polygonal shapes:
performing a sample region partitioning using each of the different polygonal shapes; and
determining a GPC likelihood for each of a plurality of sample regions of the sample region partitioning determined using each of the different polygonal shapes.

13. The method of claim 9, further comprising performing a scene registration including aligning image patterns in the first image to those in the second image.

14. The method of claim 13, wherein performing a scene registration includes transforming at least one of the first and second images into a common reference frame, and aligning image patterns between the transformed first and second images.

15. An image analysis system for detecting at least one of insertion, removal, and change of objects of interest through the comparison of a first image and a second image containing a common area of interest, the system comprising a computer programmed with:
a first component configured to determine a likelihood of change for a plurality of portions of the first and second images;
a second component configured to group the plurality of portions into one or more image regions based upon their likelihood of change; and a third component configured to prioritize the one or more image regions according to an image region score for each of the one or more image regions, the image region score being indicative of at least one of insertion, removal, and change of an object of interest within the common area of interest.

16. The system of claim 15, wherein the third component is configured to prioritize the one or more image regions using an algorithm that includes:

$$\sum_{R_i=0}^{N_R} \sum_{C_j=0}^{N_{Ri}} \left( \sum_{G_k=R_{i_{min}}}^{R_{i_{max}}} f(C_j, N_{R_i G_k}) \ln \left[ \frac{\sum_{G_k=R_{i_{min}}}^{R_{i_{max}}} f(C_j, N_{R_i G_k})}{\sum_{S_j=0}^{N_{Ri}} \sum_{G_k=R_{i_{min}}}^{R_{i_{max}}} f(S_j, N_{R_i G_k})} \right] \right)$$

Where f(a,b)=1, when a=b
  f(a,b)=0, when a≠b
$N_R$=number of regions
$N_{Ri}$=number of values in region i
$R_{i_{min}}$=minimum value in region i
$R_{i_{max}}$=maximum value in region i.

17. The system of claim 15, wherein the first component is configured to determine a likelihood of change for a plurality of portions of the first and second images using a GPC algorithm that includes, for a plurality of different polygonal shapes:
   performing a sample region partitioning using each of the different polygonal shapes; and
   determining the GPC likelihood for each of a plurality of sample regions of the sample region partitioning determined using each of the different polygonal shapes.

18. The system of claim 15, wherein the computer is further programmed with a fourth component configured to perform a scene registration including aligning image patterns in the first image to those in the second image.

19. The system of claim 15, wherein the computer includes a memory device coupled to a processor, the processor being configured to execute computer-readable instructions, and wherein one of more of the first, second, and third components is configured as a module of computer-readable instructions stored within the memory device.

20. The system of claim 19, further comprising a data acquisition system configured to acquire the first and second images of the common area of interest, and to communicate the first and second images to the computer.

\* \* \* \* \*